Aug. 11, 1959     P. VAN BUSKIRK     2,898,655
CABLE FERRULE
Filed June 15, 1955
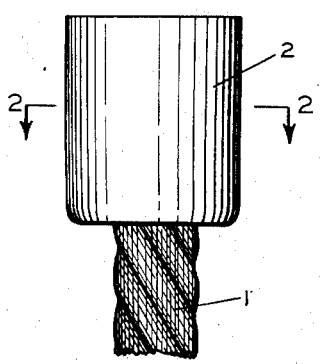
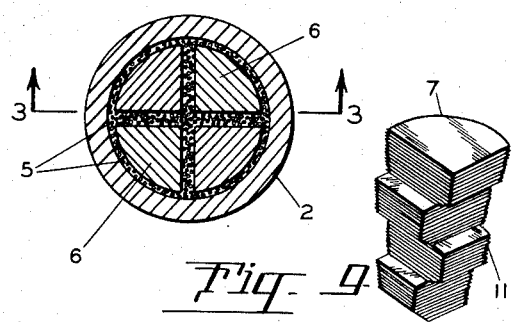
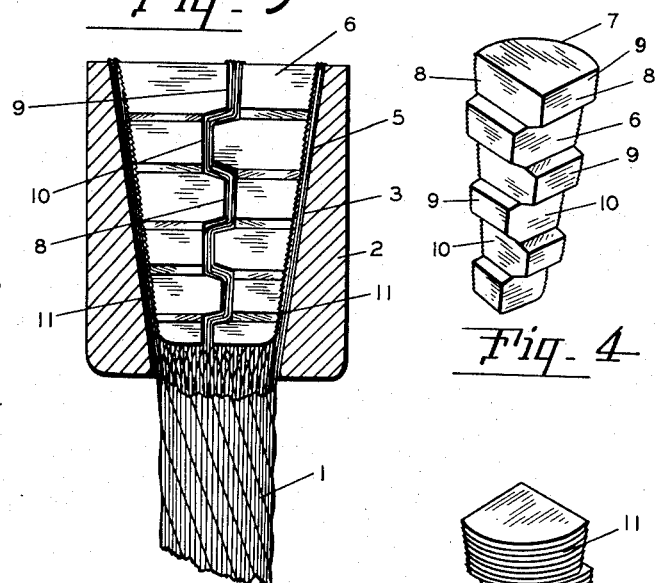
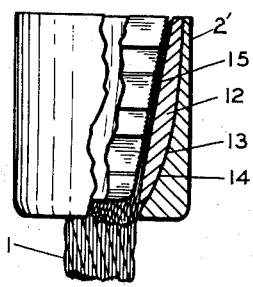
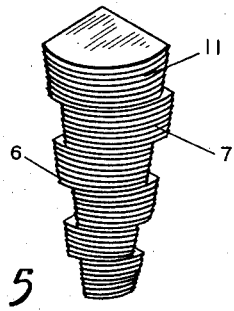
INVENTOR.
PAUL VAN BUSKIRK
BY
ATTORNEY

United States Patent Office 2,898,655
Patented Aug. 11, 1959

2,898,655

CABLE FERRULE

Paul Van Buskirk, Woodburn, Oreg., assignor to V. B. Grip Sales, Portland, Oreg.

Application June 15, 1955, Serial No. 515,631

4 Claims. (Cl. 24—114.5)

The present invention relates to improvements in finishing the ends of cables or wire ropes, and more particularly to a ferrule which may be applied to the end of the cable or wire rope with the use of conventional tools.

The primary object of the invention is to provide a structure which will lock the end fibers of a cable to prevent their unraveling and simultaneously provide an enlarged attaching head for the cable.

Another object of the invention is to provide a ferrule of the class described which may be applied to the cable with conventional tools without the use of babbitt.

A further object of the invention is to provide a ferrule of the class described above which is caused to tighten on the cable fibers by pressures exerted in a direction away from the cable end.

A still further object of the invention is to provide a structure of the class described as an attachment for a babbitt-type ferrule permitting the use of said ferrule without babbitt.

Other objects and advantages will become apparent in the following specification when read in light of the attached drawings, in which:

Figure 1 is a side elevation of the invention shown attached to a cable which is partly broken away.

Figure 2 is a transverse cross-section of the device taken along the line 2—2 of Figure 1, looking in the direction of the arrows.

Figure 3 is an enlarged longitudinal cross-section of the device taken along the line 3—3 of Figure 2, looking in the direction of the arrows.

Figure 4 is a perspective view showing the inside faces of one of the clamping wedges.

Figure 5 is a perspective view showing the outside face of one of the clamping wedges.

Figure 6 is a side elevation of a modified form of the invention shown with parts broken away and in section for clarity.

Figure 7 is a side elevation, partly broken away and partly in section, of an adapter plug used in the modification shown in Figure 6.

Figure 8 is a perspective view of a ferrule being applied to a cable end.

Figure 9 is a perspective view of a modified form of clamping wedge, showing the inside faces thereof.

Referring now to the drawings in detail, wherein like reference numerals indicate like parts throughout the several figures, the reference numeral 1 indicates a wire rope or cable of the type having individual wires twisted into strands which are combined by twisting into the cable 1. The normal method of finishing the ends of such cables 1 is to provide a ferrule or cup-like element surrounding the cable end and pour melted babbitt within the cup so that the babbitt will flow into the interstices of the cable, locking the cable to the cup. This construction is completely impossible for use of a field worker without special equipment and skills.

The instant invention comprises a ferrule 2 having a central cone-shaped bore 3 passing axially therethrough.

The individual wire ends 4 of the cable 1 are unraveled from their strands and then positioned as shown at 5 within the ferrule 2. Wedges 6 are positioned so as to be interposed between the wire ends 4 and then are driven with the wire ends 4 into the ferrule 2. The wedges 6, as can be seen in Figures 4 and 5, are provided with arcuate outer surfaces 7 which coincide in shape with the conical bore 3 of the ferrule 2.

The inner sides 8 of the wedges are corrugated and have outwardly extending tongues 9 offsetting recesses 10 therebetween. The outer surfaces 7 of the wedges 6 are knurled as at 11 to provide a positive grip of the surface 7 with the wires 4. The corrugated sides 8 of the wedges 6 are alternated in each wedge 6 so that in each transverse plane one surface 8 will have a tongue 9, while the adjacent surface 8 has a recess 10. Each of the wedges 6 is made identical with the other wedges 6, so that the recesses 10 of one wedge 6 will receive the tongues 9 of the adjacent wedge 6, with four wedges 6 being used in each ferrule bore.

As is also illustrated in Figure 3, the wires 4 are positioned between the faces 8 of the wedges 6 to further lock the wires 4 into the ferrule 2.

In applying the ferrule 2 and the wedges 6 to the cable end, the wedges 6 may be inserted within the unraveled ends 4 of the cable, as shown in Figure 8, and the ferrule 2 may be then driven toward the end of the cable 1 until the wedges 6 are completely encompassed thereby. Ragged wire ends 4 which extend from the ferrule 2 after this operation may be trimmed off in any suitable manner.

In a modified form of the invention, a standard ferrule 2' is fitted with an adapter 12 having an outer surface 13 shaped to conform to the arcuate shape of a longitudinal bore 14 extending through the ferrule 2'. The adapter 12 is provided with an internal cone-shaped bore 15 to receive the wedges 6 in the same manner as in the ferrule 2.

A further modification of the invention is disclosed in Figure 9, wherein the inner surfaces 8 of the wedge have the knurled surfaces 11 extending thereover to increase the gripping power of the tongues 9 and recesses 10 on the wires 4 of the cable 1.

In the use and attachment of the invention to a wire rope or cable, the wires 4 of the cable 1 are first unraveled and flared outwardly, as indicated in Figure 8, each of the wire ends 4 being separated from the other wire ends 4. The wedges 6 are then positioned within the wire ends 4 and the ferrule 2, or the ferrule 2', with its adapter 12, is positioned over the wedges and cable ends 4 and driven outwardly, away from the cable 1, until the wedges 6 are tightly wedged in the ferrule 2 or 2' with the wires 4 of the cable 1 securely clamped therein. After the wedges 6 and ferrules 2 or 2' have been securely clamped to the end of the cable 1, the wire ends 4 are cut to provide a smooth end for the ferrule 2 or 2'.

Having thus described the preferred embodiments of the invention, it should be understood that numerous structural modifications and adaptations may be resorted to without departing from the scope of the appended claims.

What is claimed is:

1. A cable ferrule for attachment to an end of a stranded wire cable, comprising a generally cylindrical body having an axial bore extending therethrough with said bore converging from a relatively large diameter at one end of said body to a substantially smaller diameter at the other end of said body, said stranded cable being adapted to extend axially through said bore, a plurality of segmental tapered wedge members positioned in said bore in said body, a first radial clamping face formed on each of said wedge members, a second radial clamping face formed on each of said wedge members at an angle to said first radial clamping face, said first and second radial clamping faces having their inner edges joined, an outer arcuate clamping face on each of said wedge members extending between the outer terminal edges of said first and second named radial clamping faces, said outer clamping faces each being adapted to cooperate with a portion of the wall of said bore in said body for clamping a portion of the strands of said cable between said outer face and said body, said first and second named radial clamping faces each being provided with a plurality of tongues separated by grooves with the tongues of each radial clamping face extending into the grooves of an opposed radial clamping face of an adjacent wedge member to alternately offset the strands of cable adapted to be engaged therebetween to lock the cable in said body.

2. A device as claimed in claim 1 wherein said first and second radial clamping faces are transversely knurled to provide an increased locking grip surface for engagement with said cable.

3. A device as claimed in claim 1 wherein said arcuate faces of said wedge members are transversely knurled to increase the frictional surface for engagement thereof with the strands of said cable.

4. A device as claimed in claim 1 wherein the first and second radial clamping faces and the arcuate clamping faces of said wedge members are transversely knurled to increase the frictional surface for engagement of said wedges with the strands of said cable.

References Cited in the file of this patent

UNITED STATES PATENTS

| | | |
|---|---|---|
| 294,392 | Kortum | Mar. 4, 1884 |
| 689,326 | Sands | Dec. 17, 1901 |
| 1,466,127 | Gottschalt | Aug. 28, 1923 |
| 1,857,436 | Cole | May 10, 1932 |
| 2,177,364 | Fotsch | Oct. 24, 1939 |
| 2,237,618 | Weatherford | Apr. 8, 1941 |
| 2,341,922 | King | Feb. 15, 1944 |
| 2,357,733 | Guderian | Sept. 5, 1944 |
| 2,538,043 | Roy | Jan. 16, 1951 |